(12) United States Patent
Massonnet

(10) Patent No.: US 6,264,143 B1
(45) Date of Patent: Jul. 24, 2001

(54) RADAR INTERFEROMETRY DEVICE

(75) Inventor: Didier Massonnet, Saint Orens de Gameville (FR)

(73) Assignee: Centre National d'Etudes Spatiales (FR)

( * ) Notice: Subject to any disclaimer, the term of this patent is extended or adjusted under 35 U.S.C. 154(b) by 0 days.

(21) Appl. No.: 09/462,782

(22) PCT Filed: May 12, 1999

(86) PCT No.: PCT/FR99/01139

§ 371 Date: Apr. 26, 2000

§ 102(e) Date: Apr. 26, 2000

(87) PCT Pub. No.: WO99/58997

PCT Pub. Date: Nov. 18, 1999

(30) Foreign Application Priority Data

May 13, 1998 (FR) .................................................. 98 06016

(51) Int. Cl.$^7$ ................ G05D 1/12; B64G 1/44; G01S 13/00; H04B 7/185

(52) U.S. Cl. ............ 244/158 R; 244/173; 342/25; 342/354

(58) Field of Search ................ 244/158 R, 173; 455/12.1, 13.1, 13.2, 13.3; 342/25, 354

(56) References Cited

U.S. PATENT DOCUMENTS 5,553,816 * 9/1996 Perrotta ........................ 244/185 R

OTHER PUBLICATIONS

D. Massonet, "Satellite Radar Interferometry", Scientific American, vol. 276, No.2, Feb. 1997, pp. 46–53 (XP000696084).

H. A. Zebker et al., "Mapping the World's Topography Using Radar Interferometry: The Topsat Mission", Proceedings of the IEEE, vol. 82, No. 12, Dec. 1, 1994, pp. 1774–1786 (XP000492720).

A. Freeman et al., "SAR Applications in the 21$^{st}$ Century", Archive Fur Elektronik Und Ubertragungstechnik, vol. 50, No. 2, Mar. 1, 1996, pp. 79–84 (XP000595503).

* cited by examiner

Primary Examiner—Thomas H. Tarcza
Assistant Examiner—Fred H. Mull
(74) Attorney, Agent, or Firm—Mason, Kolehmainen Rathburn & Wyss

(57) ABSTRACT

The invention relates to radar interferometry apparatus comprising at least one emitter satellite (E) and a constellation of receiver satellites (S). The receivers are accurately synchronous and their orbits have the same eccentricity which is different from that of the orbit of the emitter. During one orbital period, the satellites travel round a relative ellipse (G) over which they are uniformly distributed. The invention provides applications specifically to measuring ocean currents, measuring world topography, and differential interferometry.

9 Claims, 5 Drawing Sheets

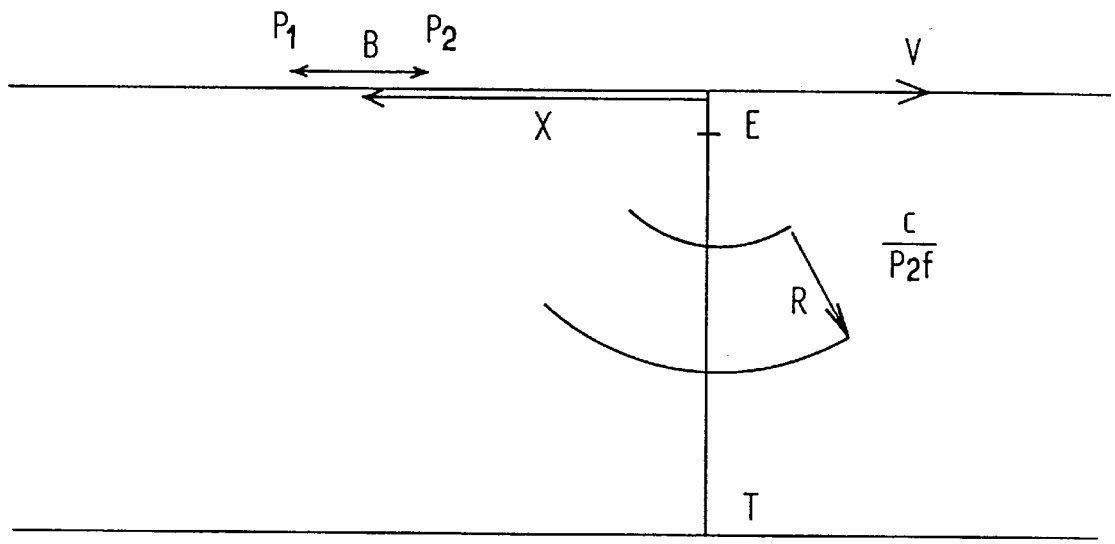
FIG_1
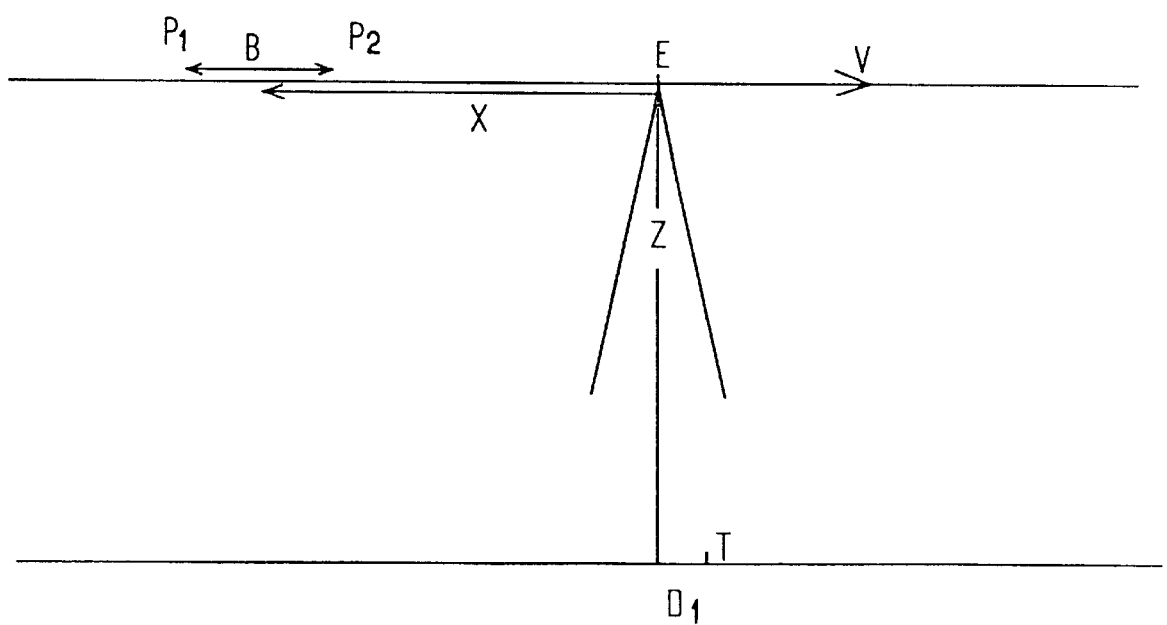
FIG_2

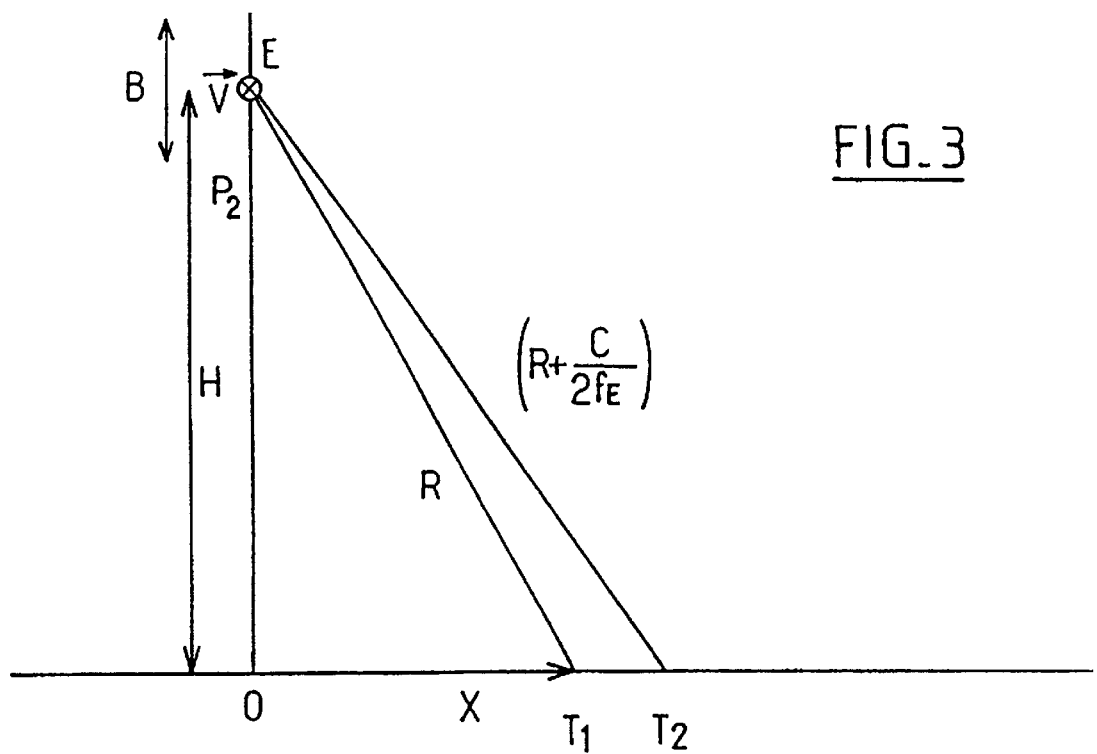
FIG_3
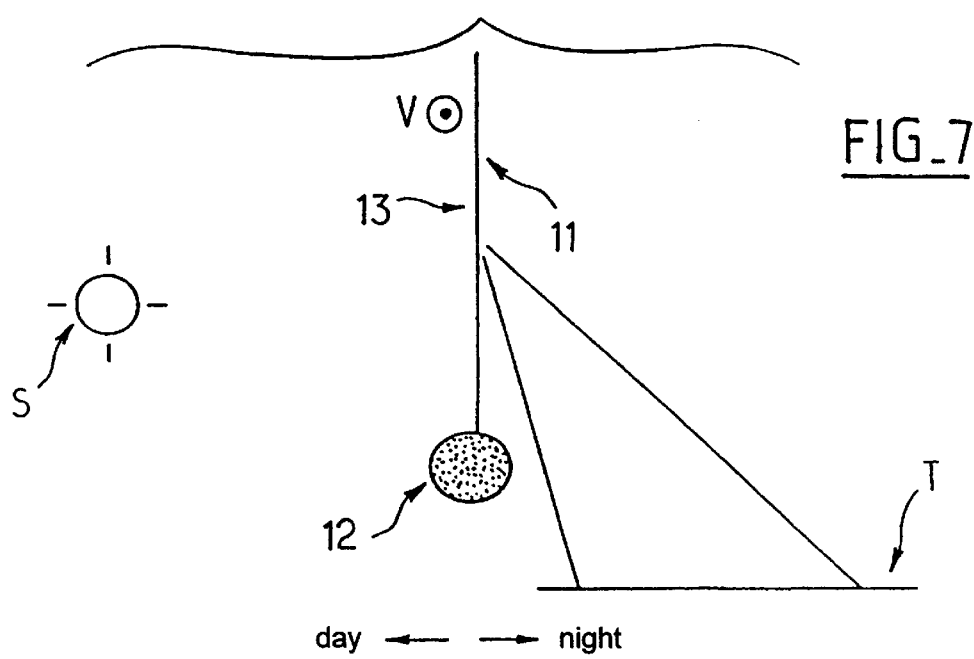
FIG_7

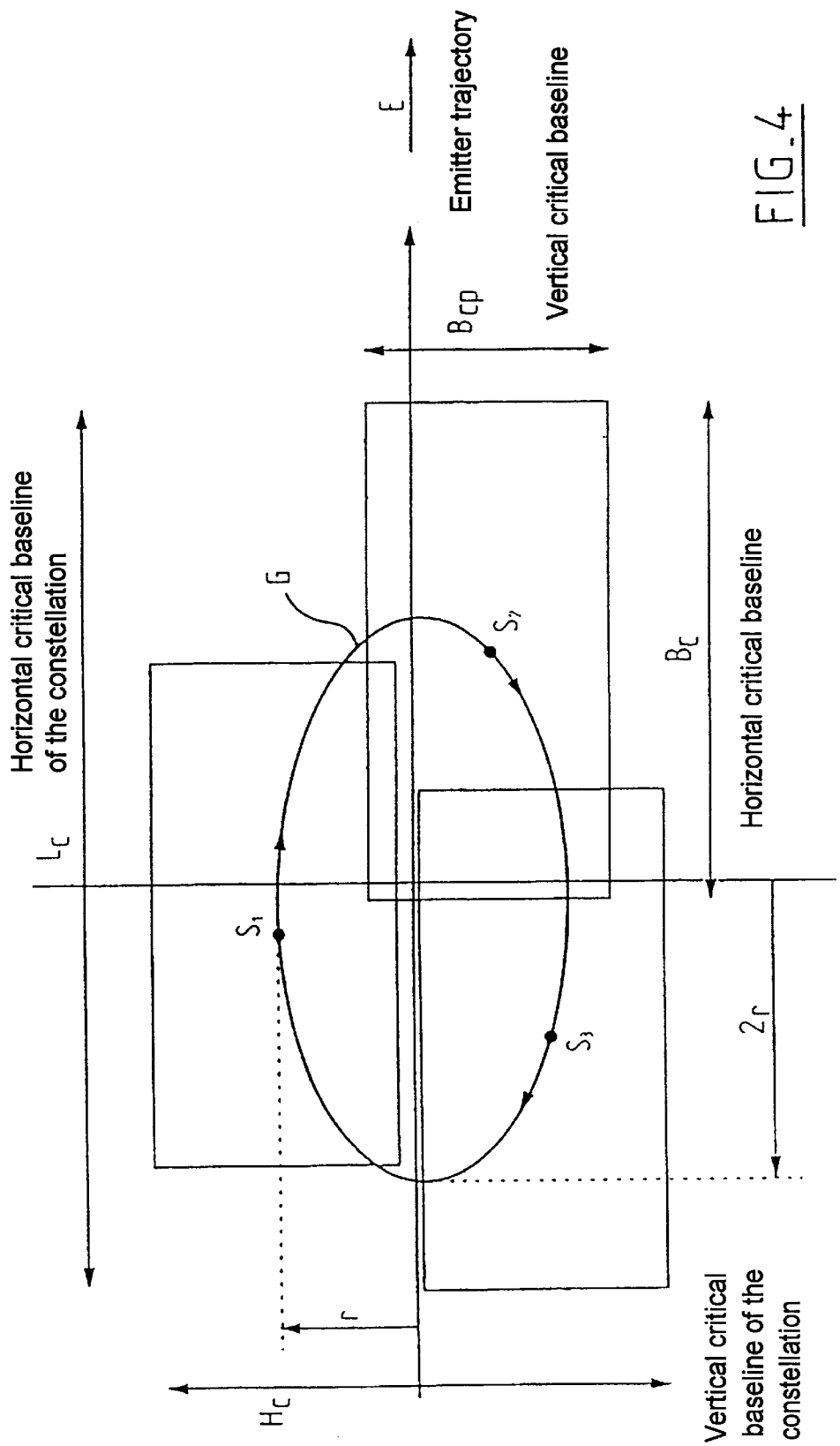
FIG._4

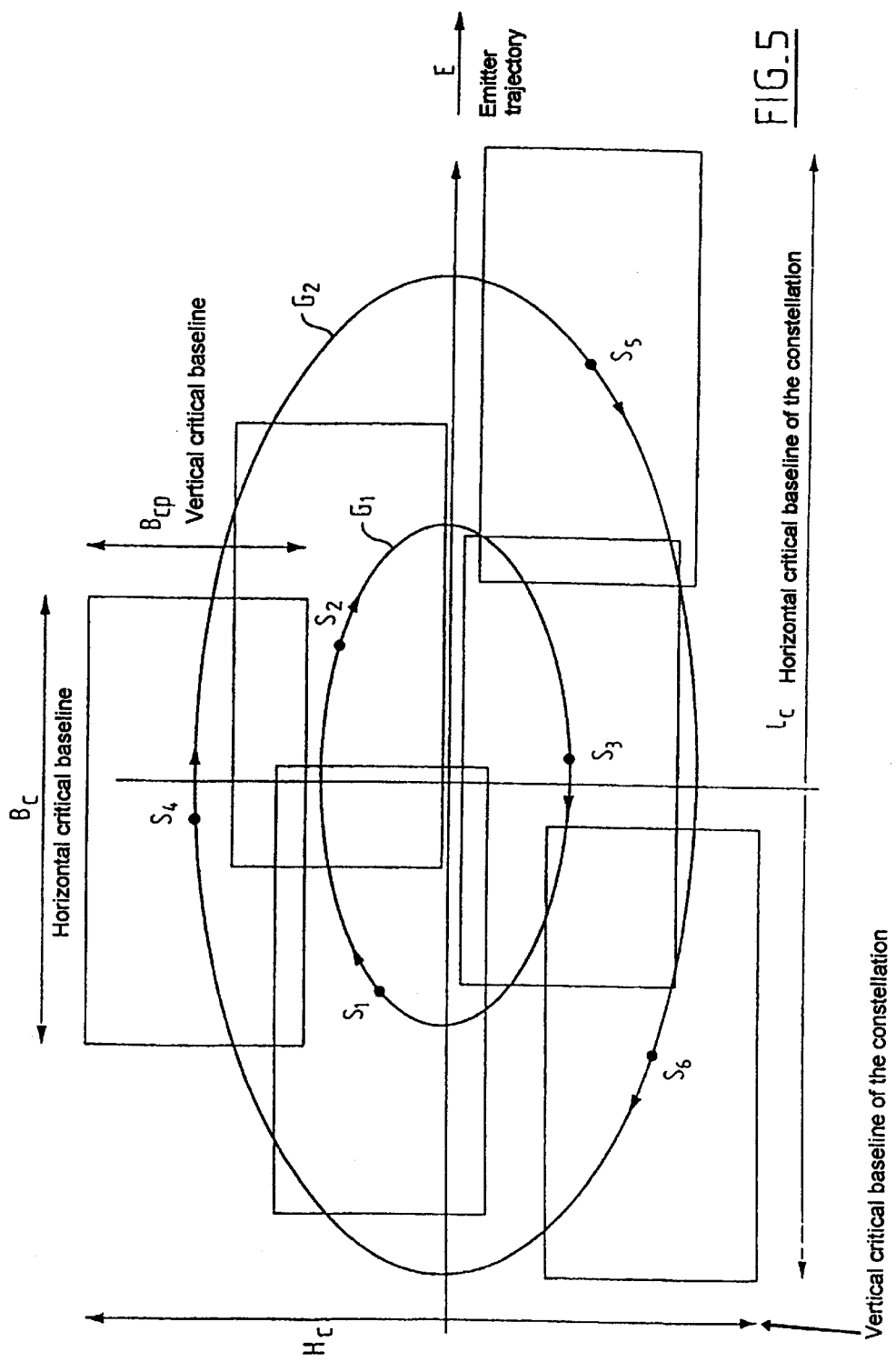

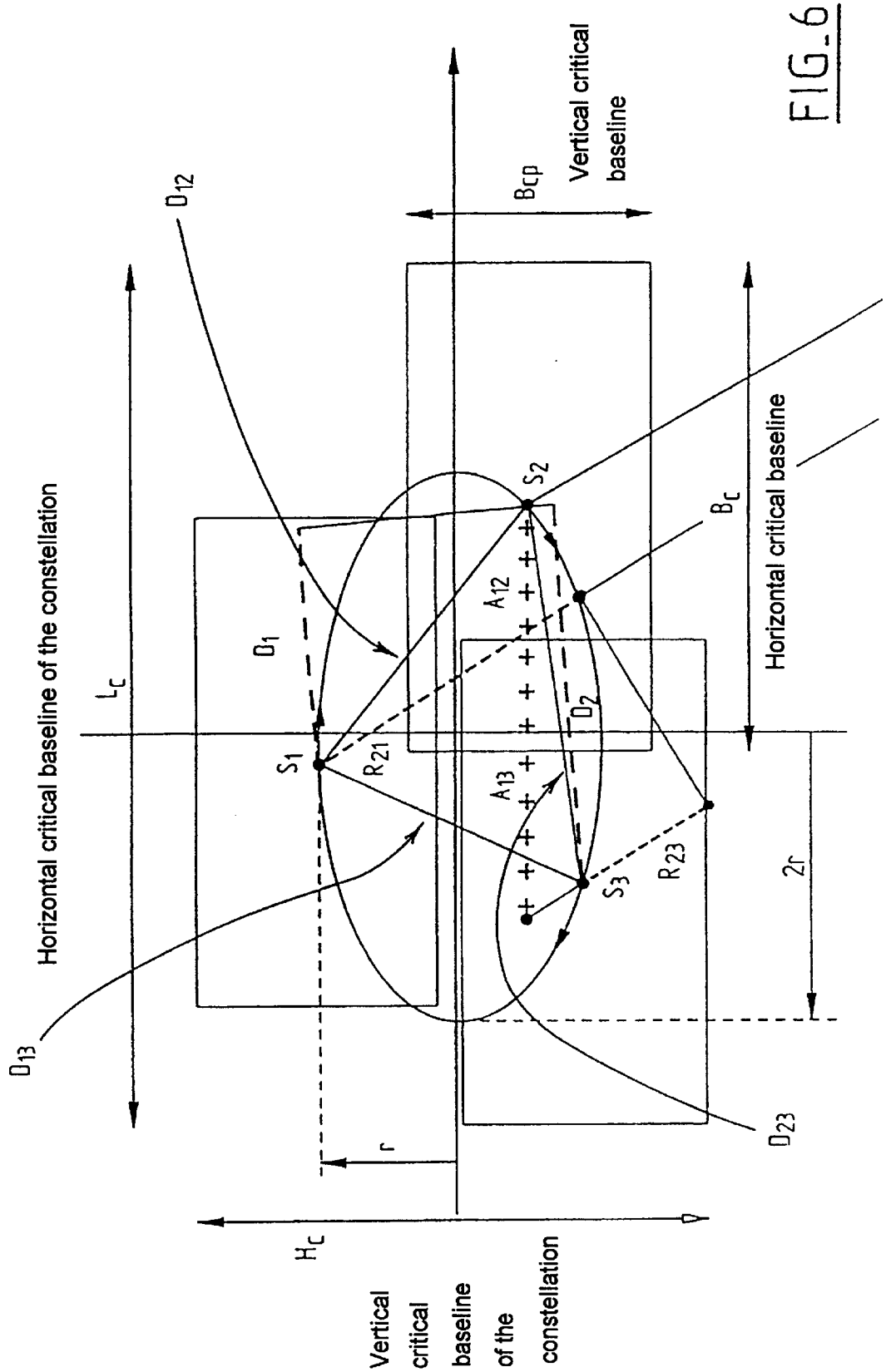
FIG._6

RADAR INTERFEROMETRY DEVICE

BACKGROUND OF THE INVENTION

1. Field of the Invention

The present invention relates to radar interferometry apparatus and to applications thereof.

2. Background of the Invention

Over the last few years, radar imaging has been enriched by the spectacular possibilities made available by combining a plurality of radar images coherently, as illustrated in particular by the following publications:

R. Golstein and H. Zebker "Interferometric radar measurement of ocean surface currents", Nature, 328, 707–709, 1987;

C. Prati and F. Rocca "Improving slant-range resolution with multiple SAR surveys", IEEE Trans. Aerospace Elec. Sys., 29, 135–143, 1993;

H. Zebker and R. Golstein "Topographic mapping from interferometric SAR observation", J. Geophys. Res., 91, 4993–5001, 1986; and D. Massonnet and T. Rabaute "Radar interferometry: limits and potential", IEEE Trans. Geosc. and Remote Sensing, 31, 455–464, 1993.

SUMMARY OF THE INVENTION

The present invention provides radar interferometry apparatus comprising at least one emitter satellite and at least one constellation of receiver satellites, the apparatus being characterized in that the satellites are placed on orbits selected in such a manner that the receiver satellites aim at the zone of the ground that is illuminated by the emitter satellite, and such that:

the major axes thereof have the same length so that the satellites are accurately synchronous;

the focuses are separated by a distance which is the same for each of the orbits of the receiver satellites and which is greater than the distance between the focuses of the orbit of the emitter satellite, such that the eccentricity of a receiver satellite orbit is different from that of the emitter satellite orbit; and the arguments of their perigees have values that are uniformly distributed over 360° such that during one orbital period the receiver satellites travel round an ellipse over which they are uniformly distributed, said ellipse being centered on the position that the emitter satellite would have had if its orbit had the same ascending node longitude and the same phasing as the orbits of the receiver satellites.

Preferably, the receiver satellites are permanently aimed at the ground zone illuminated by the emitter satellite, however in certain applications it is possible for the receiver satellites to aim only as a general rule or even only occasionally at the zone illuminated by the emitter satellite.

The constellation of passive receivers makes it possible to implement all radar options by using an existing radar satellite as the source. The proposed constellation is of low cost given that it is of a passive nature.

Preferably, the emitter satellite is synchronous with the receiver satellites.

Preferably, the constellation has one or more groups of three receiver satellites placed on one or more concentric elliptical orbits.

The emitter satellite can form a portion of the constellation or it can be independent thereof, depending in the implementation.

Preferably, the radar receivers are designed to record continuously the signal from the ground zone illuminated by the emitter satellite, means being provided for resynchronizing the signal as recorded in this way in the form of successive rows organized by increasing distance.

Advantageously, the emitter satellite is selected from the group of radar observation satellites such a ERS-1, ERS-2, Radarsat, and J.ERS-1.

BRIEF DESCRIPTION OF THE DRAWINGS

The invention is further explained below with reference to the figures of the accompanying drawings, in which:

FIGS. 1 and 2 are diagrams relating to how azimuth resolution and interferometry are defined along the track;

FIG. 3 is a diagram relating to how distance resolution and perpendicular interferometry are defined;

FIGS. 4 and 5 are diagrams of radar-receiver satellite constellations in accordance with the present invention;

FIG. 6 is analogous to FIG. 4; and

FIG. 7 is a diagrammatic side view of an emitter satellite used in an embodiment of the invention.

DETAILED DESCRIPTION OF THE PREFERRED EMBODIMENTS

Azimuth Resolution

In FIGS. 1 and 2, references $P_1$ and $P_2$ designate two radar receiver satellites, reference E designates a radar emitter satellite, and T designates a radar target on the ground.

The emitter satellite E is a conventional radar satellite which emits and which receives pulses for the purpose of making images therefrom, e.g. the ERS-1 satellite, and its radiation is used in another manner by means of two passive receiver satellites $P_1$ and $P_2$ that are situated on orbits having the same period as that of E.

The satellite E emits radar pulses at a rate suitable for its own requirements. The pulse repetition frequency of those pulses is written prf. Between two pulses, E, $P_1$, and $P_2$ all travel the same distance D. The distance between E and T is R. The distance between E and the center of $P_1$ and $P_2$ is X. The distance between $P_1$ and $P_2$ is B.

The calculations below assume that the satellites follow rectilinear trajectories at a speed v (i.e. v=prf*D). The curvature of the orbits alters the theoretical results slightly, but does not change the nature or the order of magnitude thereof. Similarly, if ET were not perpendicular to the speed, as when taking a picture at non-zero Doppler, the same reasoning can be followed by replacing E with E', vertically above T, and by redefining X and R accordingly.

The various distances between the target T and the receivers $P_1$ and $P_2$ do not depend on the position of E since the path traveled by the wave is common on the segment (E,T). It is given by:

$$\Delta_1 = \sqrt{R^2 + \left(X + \frac{B}{2}\right)^2} - \sqrt{R^2 + \left(X - \frac{B}{2}\right)^2}$$

At the following pulse, this difference becomes:

$$\Delta_2 = \sqrt{R^2 + \left(X - D + \frac{B}{2}\right)^2} - \sqrt{R^2 + \left(X - D - \frac{B}{2}\right)^2}$$

Given the small relative value of D and of B, the following apply:

$$\Delta_1 \approx \frac{BX}{\sqrt{R^2 + X^2}} \text{ and } \Delta_2 \approx \frac{B(X-D)}{\sqrt{R^2 + X^2}}$$

The path length difference between $P_1$ and $P_2$ relative to T is thus:

$$\Delta_1 - \Delta_2 \approx \frac{BD}{\sqrt{R^2 + X^2}}$$

If the wavelength of the radar E is $\lambda$, then the critical baseline $B_c$ is defined by:

$$B_c = \frac{\lambda}{D}\sqrt{R^2 + X^2}$$

This magnitude defines the spacing of the receivers from which the path length difference coming from a single target changes by more than the wavelength between two successive pulses, which, for the same target, corresponds to a Doppler effect difference between the two receivers that is greater than or equal to prf. The signals recorded by the receivers are then independent and can no longer be used for creating interference fringes by combining their phases. In contrast, combining the signals can make it possible to improve resolution by a factor of two, using a procedure similar to that in SPOTLIGHT mode, but by means of a passive technique.

For a satellite of the ERS-1 type in band C, $B_c$ is about 10 km.

The same reasoning applies to more than two receivers. Thus, three receivers placed at intervals of 10 km on the same orbit make it possible to obtain resolution of 2 meters using ERS-1 data, thereby improving resolution by a factor of three.

Interferometry Along the Track

If the distance B between the receivers is less than $B_c$, then the signals they receive are independent in the proportion $B/B_c$, but coherent otherwise. In particular, if the target T is seen by the receiver $P_1$ at a certain Doppler value, it can be seen a few instants later at the same Doppler value by the receiver $P_2$ providing B is less than $B_c$. More precisely, by using the notation of FIG. 2, the variation in the distance between the emitter E, the target T, and the receiver $P_1$, from one pulse to the next is the difference between:

$$\Delta_1 = \sqrt{R^2 + D_1^2} - \sqrt{R^2 + (D_1 - D)^2}$$

and:

$$\Delta_2 = \sqrt{R^2 + \left(X + D_1 + \frac{B}{2}\right)^2} - \sqrt{R^2 + \left(X + D_1 - D + \frac{B}{2}\right)^2}$$

For the receiver $P_2$, and in the general case where the target T occupies another position $D_2$, this difference becomes the difference between:

$$\Delta_3 = \sqrt{R^2 + D_2^2} - \sqrt{R^2 + (D_2 - D)^2}$$

and $$\Delta_4 = \sqrt{R^2 + \left(X + D_2 - \frac{B}{2}\right)^2} - \sqrt{R^2 + \left(X + D_2 - D + \frac{B}{2}\right)^2}$$

To observe the target T under the same Doppler value with each of the receivers, it is necessary to find a condition whereby:

$$\Delta_1 + \Delta_2 = \Delta_3 + \Delta_4$$

otherwise:

$$\Delta_1 - \Delta_3 = \Delta_4 - \Delta_2$$

To the first order, this condition is expressed as follows:

$$\frac{D}{R}(D_1 - D_2) = \frac{D}{\sqrt{R^2 + X^2}}(D_2 - D_1 - B)$$

$$\left(\frac{\sqrt{R^2 + X^2}}{R} + 1\right)(D_2 - D_1) = B$$

$(D_2 - D_1)$ must be less than the width Z illuminated by the antenna of the emitter so that the target T is illuminated in both cases.

In practice, the limit on the method lies more with the duration of the target T. Thus, with ocean currents, targets are surface elements of the water. If the lifetime of such an ephemeral target is 0.1 seconds, for example, then it is necessary to set:

$$(D_2 - D_1) < 0.1 \text{ v}.$$

Distance Resolution

It is assumed that the configuration is as shown in FIG. 3, in a plane perpendicular to speed. The figure shows E, $P_1$, and $P_2$. and also two targets $T_1$ and $T_2$ on the ground. The figure assumes that E, $P_1$, and $P_2$ occupy the same orbital plane, but that is not absolutely essential.

The satellite E sends out radar pulses over a certain bandwidth for its own needs. The corresponding critical sampling frequency is written $f_e$. The distance between E and $T_1$ is R. The distance between E and $T_2$ is $R + c/2f_e$. The distance between $P_1$ and $P_2$ is B. The distance between $T_1$ and O is X. The distance between E and O is H.

The distances between the target $T_1$ and the receivers $P_1$ and $P_2$ do not depend on the position of E since the path traveled by the wave is common over the segment (E,T). They are given by:

$$\Delta_{p1t1} = \sqrt{X^2 + \left(H + \frac{B}{2}\right)^2}$$

$$\Delta_{p2t1} = \sqrt{X^2 + \left(H - \frac{B}{2}\right)^2}$$

$$\Delta_{p1t1} - \Delta_{p2t1} \approx \frac{BH}{R}$$

For the target $T_2$, these differences become:

$$\Delta_{p1t2} = \sqrt{X'^2 + \left(H + \frac{B}{2}\right)^2}$$

-continued $$\Delta_{p2t2} = \sqrt{X'^2 + \left(H + \frac{B}{2}\right)^2}$$

with:

$$\sqrt{X'^2 + H^2} = R + \frac{c}{2f_e}$$

whence:

$$\Delta_{p1t2} - \Delta_{p2t2} \approx \frac{BH}{R}\left(1 - \frac{c}{2f_e}\right)$$

using the wavelength λ, another type of critical baseline $B_{cp}$ is defined as follows:

$$B_{cp} = \frac{2f_e \lambda R^2}{Hc}$$

This magnitude defines the vertical separation of the receivers beyond which the path length difference from two successive samples changes by more than the wavelength. As before, the signals recorded by receivers are independent and no longer enable interference fringes to be created by combining their phases. In contrast, combining the signals can improve distance resolution by a factor of two.

Below, the domain centered on the receiver in the orbital plane that is of length $B_c$ and of height $B_{cp}$ (FIGS. 4 and 5) is referred to as the "interferometric area".

For a band C satellite of the ERS-1 type, $B_{cp}$ is about 5 km. The same reasoning applies to more than two receivers. Thus, three receivers placed at 5 km intervals vertically make it possible to obtain ground resolution of about 6 meters perpendicularly to the track, using ERS-1 data for which said resolution is 20 m.

Because of the shape of the relative ellipse G, it is advantageous for the baseline $B_c$ to be more or less equal to twice the baseline $B_{cp}$, i.e.: $HP_D \approx 2RP_A$ where $P_D$ and $P_A$ are the distance and azimuth pixel sizes (respectively equal to $c/2f_e$ and D). As explained, the ERS-1 and ERS-2 satellites satisfy this condition approximately. A satellite such as Radarsat can also satisfy it. In any event, the baselines $B_c$ and $B_{cp}$ are variable within an image, and their values should be taken as being by way of indication.

In the context of the invention, it is accepted that data can be picked up by means of an antenna that is small (compatible with a micro-satellite). Image isolation relative to radar ambiguities in terms of distance and of azimuth is therefore poorer than at the emitter, where the contribution of ambiguities is reduced when the wave is sent out and when it returns, as compared with ambiguity being reduced in the images of the receivers only when the wave is sent out. In absolute terms it is difficult to quantify the loss of quality associated with increasing distance and azimuth ambiguity since it depends on the characteristics of the emitter antenna. However, it can be observed that the ambiguities do not participate in coherent combination. Coherent combination of images requires a prior step of the images from the receivers being superposed. This superposition is optimized on the main image, which is not ambiguous.

The ghost images corresponding to distance ambiguities, i.e. that come from continuation of the echo from the preceding pulse (further away perpendicularly to the track) or from the beginning of the echo from the following pulse (from closer targets of the track) are not superposed. In order to be able to produce topographical information, the receivers must make observations from viewpoints that are slightly offset. The change of incidence that results from this offset must not exceed a critical value such that the progressive offset of two images remains typically less than one wavelength per pixel. The relative offset must thus remain less than the ratio of the sampling frequency over the carrier frequency, i.e. typically 0.3% to 1% depending on the satellite. The lower limit for this offset corresponds to the need to create a topographical effect. It cannot be less than one-tenth of the ultimate limit mentioned above. It can thus be ensured that the relative offset between the images attains at least 0.3% to 0.1%. Geometrically speaking, this amounts to making the radius of the wheel equal to one-tenth of the "critical vertical baseline".

Since the number of pixels in distance between the real image of the ambiguous image is equal to the ratio of the sampling frequency over the pulse repetition frequency, which ratio is equal to 10,000 (for ERS-1), given the smallest realistic values for the relative offset, the ambiguous images remain offset by several tens of pixels in distance even though the real images coincide. The distance ambiguities therefore do not give rise to coherent combination.

In mathematical terms, let the radar carrier frequency be $f_c$, the distance sampling frequency $f_d$, and the pulse emission frequency $f_a$. The concept of ambiguity offset in distance is considered. It is assumed that the wheel is set to a times the vertical critical baseline (0<α<1). The offset is thus equal to one pixel for every n pixels, with:

$$n = \frac{1}{\alpha} \cdot \frac{f_c}{f_d}$$

but the difference in pixels between two successive pulses is equal to: $m = f_d/f_a$. The residual offset concerning ambiguities, assuming that the real image is properly positioned, is thus:

$$\frac{m}{n} = \alpha = \frac{f_d^2}{f_c f_a}$$

In the ERS case, the frequency term is 40, and thus even if the baseline is one-tenth of the critical baseline, the offset amounts to four pixels for ambiguous contributions. For a band L satellite, this term comes to 150.

Azimuth ambiguities are characterized by resolution that is poorer than that of nominal images because of the phenomenon of poorly-compensated parabolic migration for ambiguities. Even with an ERS type satellite, where parabolic migration is particularly low, the distance spread corresponds to 2.5 pixels. The mismatch of the processing leads to deterioration of the same order of magnitude in azimuth. Since the resolution cell is larger, the horizontal and vertical critical baselines are reduced by a factor of 2.5 in the ERS case. As soon as the configuration is such that the baselines reach 40% of the critical values, azimuth ambiguities cease to combine in coherent manner.

Under such conditions, the alteration to the interferometric results from the constellation is the result only of the incoherent contribution of the ambiguities. Even if the ambiguities amount to −10 dB of the real image in terms of integrated power, they cannot corrupt the phase of the real image with a standard deviation of more than 5% of a cycle. Under no circumstances can they bias the result, all they can do is add noise.

A radar observing at zero Doppler (perpendicularly to its track), analyzes frequency over the range $-\frac{1}{2}f_a$ to $+\frac{1}{2}f_a$.

This observation range corresponds to an extra distance relative to the distance at closest passage, proportional to the square of the reduced frequency, i.e.:

$$\beta \frac{f_a^2}{4}$$

where β is a geometrical factor specific to the radar system enabling the extra distance to be expressed in distance pixel units. Azimuth ambiguity as produced by the same frequencies offset by $f_a$ varies between the extra distances of:

$$\beta \frac{f_a^2}{4} \text{ and } \beta \frac{9f_a^2}{4}$$

Since the ambiguity is processed in the same manner as the real image, the extra distances thereof are compensated. There therefore remains a residual extra distance lying in the range 0 and $2\beta f_a^2$. The "distance spreading" of the ambiguous target reaches eight times the maximum value of the extra distance of the normal target. For an ERS satellite, spreading is 2.5 distance pixels. For a band L satellite such as the J-ERS1, spreading reaches 150 pixels. Distance spreading leads to spreading of the same order in azimuth, in terms of number of pixels. The ambiguous target is thus a "spot" whose pulse response is rather broad and which therefore moves quickly away from interferometric conditions. For example, an interferometric constellation placed behind an L band satellite makes its azimuth ambiguities incoherent before the vertical baseline has reached 1% of the critical vertical baseline. The degradation in azimuth resolution likewise gives rise to the satellite moving quickly out from the interferometric effect because of the horizontal critical baseline.

Perpendicular Interferometry

If the vertical distance B between the receivers is less than $B_{cp}$, then the signals they receive are independent by a proportion $B/B_{cp}$, but otherwise coherent, in a manner than is similar to that which occurs for interferometry along the track. Comparing the phases of the two images acquired by the receivers then makes it possible to calculate the topography of the terrain. Topographical sensitivity can be expressed by ambiguity altitude, which is given herein as follows:

$$h_a \approx \frac{\lambda R}{B}$$

Apparatus of the Invention

FIGS. 4 and 5 show a constellation of the invention of mutually synchronous receiver satellites S which describe an ellipse G over an orbital period about the position that would have been occupied by an emitter satellite that was isochronous relative to the emitter satellite and that described an orbit whose eccentricity had not been modified.

The regular distribution of the perigee arguments of the receiver satellites along the orbit give rise to the receiver satellites occupying regular positions on the ellipse in question, which ellipse is traveled round at a speed that is constant, seen from its center.

The minor radius r of the ellipse (i.e. the vertical radius) is associated with the additional eccentricity e of the receivers and with the semi-major axis a of the orbit of the emitter by the relationship: r=a·e. The major radius of the ellipse (the horizontal radius) is twice the minor radius.

Since the satellites travel round the ellipse at constant angular speed, it can be considered as being circle that has been subjected to horizontal elongation by a factor of two. Horizontal distances derived from the circle therefore need to be multiplied by two.

A constellation comprising two receiver satellites, can present all of the possibilities offered by the invention, but not all of the performance since, depending on the positions of the satellites around the interferometer ellipse, they are from time to time "one above the other" which makes some of the applications possible, or else "side by side", which makes other applications possible. The constellation achieves full geometrical efficiency when it has three satellites, thus enabling all applications to be performed continuously.

Relative to a circle, when three receiver satellites $S_1$, $S_2$, $S_3$ occupy the vertices of an equilateral triangle, the vertical and horizontal baselines vary within very narrow limits. The positions of the satellites on the circle are, as a function of time t, respectively as follows:

$$X_1 = r\cos\left(\frac{2\pi}{T}t\right) \quad \text{and} \quad Y_1 = r\sin\left(\frac{2\pi}{T}t\right)$$

$$X_2 = r\cos\left(\frac{2\pi}{T}t + \frac{\pi}{3}\right) \quad \text{and} \quad Y_2 = r\sin\left(\frac{2\pi}{T}t + \frac{\pi}{3}\right)$$

$$X_3 = r\cos\left(\frac{2\pi}{T}t + \frac{2\pi}{3}\right) \quad \text{and} \quad Y_3 = r\sin\left(\frac{2\pi}{T}t + \frac{2\pi}{3}\right)$$

where T is the orbital period (isochronous with E) and r is the radius of the "interferometer wheel" around which all of the receivers travel during the orbital period.

Possible horizontal or vertical baselines have the following values:

$$X_1-X_2, X_2-X_3, X_3-X_1, Y_1-Y_2, Y_2-Y_3, Y_3-Y_1$$

It is observed that:

$$1.5r < \text{Max}(X_1-X_2, X_2-X_3, X_3-X_1) < \sqrt{3}r$$

Since these two limits differ very little, it is possible to have an interferometric baseline that is stable both horizontally and vertically, with the framing being equally valid for values in Y. By selecting r in such a manner that the interferometric surfaces of the receivers overlap (non-zero intersection), it is possible to perform both interferometry along the track and perpendicular interferometry. The proportion of the signal that can be used for these operations is equal to the intersection area relative to the interferometric area of a receiver. The resolution which can be obtained by combining signals received by the constellation of receiver satellites is equal in azimuth to the nominal resolution of the radar E multiplied by $B_c$, and divided by the length $L_c$ of the union of the interferometric areas of the receivers, and in distance by the nominal resolution of E in distance terms multiplied by $B_{cp}$ and divided by the height $H_c$ of this union (FIG. 4).

The emitter may be located at the center of the ellipse or it may be ahead of it or behind it on the "orbit" of the center of the ellipse. It can also have an ascending node longitudinal that is slightly different, thus reducing the risks of collision with the satellites of the constellation. The distance between the emitter and the constellation can be as much as two to three tens of kilometers, or even more, without difficulty. The looked-for effects depend essentially on the configuration of the constellation itself.

The members of the constellation can also be given ascending node longitudes that are slightly different, but these should not lead to path differences exceeding a small fraction of the typical radius of the interferometric ellipse, since otherwise the uses described will be greatly modified or impossible.

The inclinations of the emitter and of the receivers must, however, remain very similar, since otherwise the constellation will rapidly be deformed.

Geometry of the Constellation

Accurate calculation of relief and implementation of super-resolution require accurate knowledge of the geometry of the constellation. This knowledge can be obtained from an on-board system of the DORIS or GPS type, and it can then be refined by correlation between the images from the receivers, or after the interferometric baseline has been adjusted by eliminating residual fringes on a landscape.

If a digital model is available of global terrain of average resolution, injecting this model before processing to calculate the interferometric altitude will give rise to residues having a standard deviation that corresponds to the improvement in resolution provided by using the invention. A rough model, and indeed one that is very poor (e.g. 30 meters (m) of vertical root mean square (rms) error on cells having a side of 100 m) makes it possible to set the interferometric baseline very precisely. The average of the residue over an area having a side of 10 km, as calculated at the four corners of the interferogram, corresponds to vertical uncertainty of less than one centimeter, given the enormous amount of integration (providing the rough model is merely inaccurate, but is not biased). Centimeter knowledge of a kilometer sized stereoscopy baseline guarantees contribution to error of much less than one meter, even for variations in altitude of several kilometers. Injecting a digital model, even a rough model, also makes it possible to omit the "fringe unraveling" effect since the residues are essentially contained in a fringe.

There exists another manner of finding out the position of the satellites in the constellation by using the emitter signal in direct aiming.

Assuming that the data from the micro-satellites of the constellation as recorded on a continuous basis contains the direct signal from the emitter (possibly peak-limited), together with the indirect signals coming from the direct signal being reflected by the other satellites of the constellation, which are typically situated at about 10 km from one another, the direct signal makes it possible to measure the characteristics of the pulse and also the pulse rate.

In FIG. 5, which is analogous to FIG. 4, the distances D1, D2, D12, D13, and D23 are shown that need to be calculated, for a configuration having three satellites.

The movement of the micro-satellites relative to one another and relative to the emitter is no more than a few tens of kilometers per hour (one revolution per orbit), i.e. typically ten meters per second (in band L for which the diameter of the wheel is large). At the rate at which pulses are emitted, always greater than one kilohertz, each pulse is subjected to phase shift relative to the preceding pulse of less than one centimeter, i.e. 2% to 3% of a complete phase cycle (still in band L). This is also true in band C because the radius of the wheel is reduced in proportion. The various echoes can thus be extracted from the telemetry by distance compression followed by spectral analysis in azimuth, in which the echoes appear as peaks that are very close to zero frequency. Analyzing the exact frequencies of these peaks gives the speeds at which the micro-satellites are approaching the emitter. Observing these speeds for one minute makes it possible to characterize speeds corresponding to displacements over a fraction of a wavelength in one minute.

Distance determination performed by averaging over one minute, i.e. over about 100,000 pulses, makes it possible in theory to obtain accuracies of better than ten centimeters. It is clear that measurement limits are imposed more by the shape of the satellites and by lack of knowledge about the exact conditions of reflection. This limit is of meter order given the sizes that are typical for micro-satellites.

By correlating the images from each micro-satellite, it is possible to determine the distances $R_{21}$ an $R_{23}$ (which are not in the plane of the constellation), and also $A_{12}$ and $A_{13}$ (which are delays). The accuracies associated with these measurements are of the order of several hundreds of a pixel, compared with our present means and without prejudicing any future progress concerning correlation techniques. Assuming that all of the images are used for this determination, all of the distances will be known with accuracies of several tens of centimeters, up to one meter. The good separability of the measurements will provide localization of the same accuracy concerning the positions of the satellites, with this being reinforced in the direction perpendicular to the figure by fine adjustment of the interferometric baseline.

Radar Emitter

The emitter E is mainly a radar observation satellite, possibly one that has broken down in part. For example, a satellite whose data transmission unit has broken down can still be used as an emitter. It is also possible to use a specific emitter, possibly lacking a receiver and telemetry transmission in its payload.

Advantageously, a radar emitter can be used that has energy independence, and in particular an emitter of the kind defined in publication WO 97/34801.

The emitter is constituted essentially by an antenna-forming element (or "radar sail") which extends substantially in a plane containing the center of the earth and which carries solar cells on a face that is kept pointing towards the sun, which cells belong to a solar generator that is sufficient for powering the emitter.

FIG. 7 reproduces FIG. 4 of the above-specified publication, with 12 referencing the emitter satellite service module of that publication, and references 11 and 13 respectively designating the antenna-forming element and the cells of the solar generator.

The satellite shown is remarkable in various aspects.

Its orbit is a low orbit and the antenna-forming element 11 extends substantially in a plane containing the center of the earth (roll angle of 90°). It has the ability optionally to radiate from both of its faces.

Also, the height H of this element 11 as defined by its dimension along the gravity axis is either naturally much greater than its dimension L in its perpendicular direction (direction of the speed vector V in FIG. 6 which shows the case where the plane of the satellite coincides with the plane of its orbit), or else added to in the height direction H by an area that does to form an antenna, possibly an area that is hollow in part, whereby the satellite is naturally stabilized by the gravity gradient.

In addition, the solar cells 13 are disposed on one of the faces of the antenna-forming element 11, possibly on both of them.

Furthermore, the element 11 has, distributed over its area, points for monitoring the phase and the amplitude of the wave as emitted or received.

It is possible to accommodate a flexible structure in which deformation and absolute attitude errors are measured by processing phase measurements supplied by GPS sensors distributed over its area, and subsequently compensated by the control means.

The satellite antenna is preferably in the orbital plane and the orbit of the satellite is preferably heliosynchronous, so as to preserve a minimum solar aspect angle with the solar cells placed on a particular face of the antenna-forming element 11. The antenna face then occupies the face of the element 11 that is in the shadow, and it can also occupy the other face, over the portions thereof that are not occupied by solar cells. A local time of 6:00 AM or of 6:00 PM is optimal since the angular difference is restricted to about 30° (cumulative effect of orbit inclination and of solar ascension). Nevertheless, the large area of solar cells that can be implemented in this way makes it possible to envisage greater differences from the 6:00 AM/6:00 PM orbital plane.

Although heliosynchrony at a fixed local time makes thermal design of the element 11 easier, the satellite can also be designed to be capable of changing local time, including from side to side of the noon/midnight plane, or even to be capable of operating at a local time that drifts (more heliosynchronism, but orbit always inclined). For this purpose, it suffices that the two faces of the element 11 have areas covered in solar cells even if that means that the total surface area of solar cells needs to be increased. Nevertheless, it is clear that operation cannot be ensured whenever local time comes close to noon/midnight.

The density of solar cells 13 on the back of the element 11 can be selected in such a manner as to cover the energy requirement of said antenna without any relay by means of a battery. If necessary, the element 11 can include portions that do not form an antenna but that serve to carry solar cells.

Thus, by reusing its mechanical structure, the element 11 serves to provide a solar generator that is very powerful, and possibly much more powerful than those accompanying standard service modules having the highest performance, and it also makes it possible to achieve extreme simplification of the power supply subsystem of the service module 12 when it no longer needs to take charge of its own requirements.

Each item of equipment or group of items of equipment in the element 11 can be coupled directly to its own energy source so that the functions of transporting and converting energy are simplified and do not involve the service module 12, nor even a link therewith.

The concept of a radar sail can be envisaged for making an "illuminator" that operates on a substantially permanent basis, thereby feeding signal to a constellation of micro-satellites, and preferably six micro-satellites organized in accordance with the present invention.

The advantages of such a combination of systems are the following:

the advantage of the radar sail: simplicity and low cost; and the advantages of the present invention: a combination that is coherent under all circumstances (interferometry and super-resolution), the discretion of a system that is passive, and the difficulty of jamming it.

This combination thus leads to a radar system having super-resolution, that is difficult to jam, and that is of low cost.

Radar Receivers

A receiver satellite of the constellation is characterized by its simplicity and its low cost. Since it has no need to emit a signal, its energy consumption is low, and it requires only small means for generating and storing energy. Advantageously, the responsibility for the shape of the antenna radiation pattern and for the signal as emitted is left to the emitter. The receiver can thus make do with an antenna of small diameter, which does not need to be deployed. Consequently, it can likewise make do with aiming that is coarser than that required for the emitter.

In contrast, the geometry of the constellation must be complied with accurately, and amongst other things, that requires the receiver satellites to be exactly synchronous. Synchronism of the emitter satellite can be relaxed in some cases, in particular if the aiming ability of the constellation of receiver satellites makes it possible for them to follow the zone on the ground that is illuminated by the emitter satellite even if said zone shifts. The emitter might be a telecommunications satellite that illuminates quite a vast zone on the ground and that is situated at an altitude that is very high. The constellation of receivers can then aim at said zone even if it does not move with the zone (in general telecommunications satellites are geostationary, and they illuminate zones that are likewise geostationary). As a general rule, the lower the orbit, the more important it is for synchronism to be complied with. With heliosynchronous orbits, synchronism guarantees not only that the illuminated zone does not move, but also the possibility of remaining continuously in the vicinity of the emitter satellite, to make use of the radiation therefrom. In any event, the receivers must have very accurate positioning means. A point that favors maintaining the constellation in position is the similarity of the orbital disturbances to which both the constellation of receivers and the emitter are subjected. The identical shape of the receivers even guarantees that atmospheric braking will be practically identical, which point is less critical for the emitter since the parameter X (FIGS. 1 and 2) can vary over quite a wide range. The risk of collision can be limited by moving the receiver away (distance X in FIG. 1) and by using orbital planes that are slightly different for the receivers. For example, a longitude difference of 50 m to 100 m between the ascending nodes of the receivers provides a degree of safety. Nevertheless, these differences in longitude must not exceed a small fraction of the typical radius of the interferometric ellipse. In theory, the paths followed by the receivers never meet because of the eccentricities and the perigee settings. There is no drawback in the emitter having a much greater difference of orbital plane (e.g. 10 km to 20 km).

The receivers must sample the emitter signal at a suitable rate. The signal recorded by the receivers is therefore not organized in the form of rows that result from each pulse, but is continuous. The signal from the receivers needs to be resynchronized on the ground, e.g. by making use of the neighbors algorithm. If the receiver antennas are smaller than the emitter antenna, the signal level will be lower.

By way of example, a receiver satellite is associated with the ERS-1 satellite which emits in the C band ($\lambda$=56 mm). The antenna is circular having a diameter of about one meter. Given the lower gain, the recording is performed on two bits with a complex sampling rate of 16 MHz. The rate is constant and requires no regulation apparatus. It gives rise to telemetry at 64 Mbits per second, similar to that from other systems, such as SPOT. The receiver can thus make use of existing means (solid state memory and telemetry channel of conventional design).

It is possible to use a generic receiver that is capable of adapting to a plurality of satellites, possibly in different bands. Such a satellite can be provided with an electrical propulsion system (since its payload consumes little energy), thereby making it possible for it to perform a plurality of orbit changes, and thus pass from one emitter "client" to another, over its lifetime. An adaptable receiver also makes it possible to use the constellation for accurately locating sources of radio emission on the ground.

Applications
Applications of apparatus of the present invention are described below by way of example.

1) Military Satellite on the Basis of Civilian "Radiation"

Using the interferometric constellation, it is possible to use a radar satellite for civilian and military requirements simultaneously, but of technical and operational characteristics that are very different. By way of example, the emitter can be a civilian satellite of medium performance (resolution of about ten meters). The receiving constellation whose interferometric areas must overlap comprises one (FIG. 4) or two (FIG. 5) "interferometric wheels".

The advantages are as follows:

- Greater difficulty in jamming the military system. Jamming the civilian emitter has no effect on the images of the military receivers. The positions thereof can remain unknown to the adversary because they are discreet. It is also possible to displace the receiving constellation frequently relative to the emitter. The angular difference between the incident rays and the reflected rays nevertheless remains sufficiently small for the image to retain the same characteristics, and for reading of the image to require no special training.

- The anti-jamming advantage of the constellation is simplified by the slightly bistatic character of the images obtained by the invention. It is impossible to blind the constellation by a passive device. Whereas a "corner reflector" of giant size could mask a zone of several tens of square kilometers by saturating reception in a conventional satellite, the difference between the angles of incidence and reflection with the constellation would make such a corner ineffective. The greater the size of the corner the more it is directional.

- High resolution that is inaccessible to civilian users. High resolution results from coherently combining images from the receivers whose telemetry is not accessible to civilian users. Resolution can be better than might be thought given the bandwidth given to a particular wavelength. For example, even if an L band civilian system is legally restricted to 30 MHz, the constellation can create an image that is equivalent to very broad bandwidth (e.g. 100 MHz), thereby giving access to relative bandwidths of interest.

- The use of the horizontal baseline makes it possible either to improve resolution in azimuth, or to compare images of nominal resolution separated typically by one second. This characteristics makes it possible to detect targets that are moving because of the difference in their positions in two horizontally-separated images.

- Normally, to increase the resolution of a radar, it is necessary to increase its power given the smaller size of the cell under observation. In the invention, an increase in power can be obtained by coherent combination of the various antenna areas of the micro-satellites. In a configuration having six micro-satellites, the combined size of the receiver antennas can exceed the size of the emitter antenna. This situation is more advantageous than might be obvious since it is much easier to build and depoly six independent antennas each having an area of four square meters than it is to deploy a single antenna having an area of 25 square meters.

- Another advantage of the invention is acquisition speed. In conventional aperture synthesis radar, improving resolution in azimuth requires targets to be illuminated for a longer length of time, either because the antenna is shorter in the flight direction, or else because it is kept pointed towards the target (SPOTLIGHT mode). The invention provides super-resolution in azimuth in parallel manner, without increasing the illumination time required for a given target.

2) Measuring Ocean Currents

The use of the horizontal baseline makes it possible to draw up a chart of ocean currents. Assuming that it is necessary to limit the duration of an observation to 0.1 seconds for physical reasons, observation at one hundredth of a phase revolution (i.e. 0.3 mm in C band) leads to an estimate whose accuracy is 3 mm per second in the observation direction of the satellite. With a viewpoint of the ERS-1 type (an angle of incidence of 23°), this accuracy is degraded by a factor of 2.5 in the direction perpendicular to the track of the satellite, and by a factor of more than 3 if the direction of the current differs by less than 20° from the flight direction of the satellite. In the rather unfavorable situation of a current at 20° to satellite azimuth, measurement accuracy is ½0th of a knot. Observation to one hundredth of a revolution is realistic if it is possible to calculate a mean for the signal over areas that are of hectare order.

Interferometric effects associated with the vertical baseline will coexist therewith. Nevertheless, since the topography of oceanic surfaces is simple and known, it is easy to eliminate the "vertical" contribution which takes the form of a regular pattern of fringes to be subtracted.

3) Measuring Global Topography

For land above the water surface, the vertical baseline makes it possible to calculate global topography or to improve earlier knowledge thereof. Because observations are simultaneous, atmospheric effects are eliminated and these are the main limit at present in this application. The orbital configuration makes it possible to create a stable baseline (lying in the range 1.5 to 1.7 times the vertical radius of the "wheel") regardless of the position of the earth. It is possible to change this radius, so as to begin by calculating a coarse model of topography, that does not require "phase unraveling", and then by increasing the radius it is possible to calculate a fine model for which the coarse model suffices to "unravel the phases".

For example, a constellation coupled to the ERS-1 satellite or the ERS-2 satellite and using a radius of 100 meters (i.e. a baseline of about 150 m), will give rise to altitude with an ambiguity of 300 meters. Prior knowledge of terrestrial topography to within 300 meters can then avoid any need to have recourse to phase unrolling. The accuracy with which topography is obtained after this first pass will be better than 30 meter.

With a radius of 1000 meters (i.e. a baseline of about 1500 m), an altitude ambiguity of about 30 meters is obtained. The topography obtained during the first step then makes it possible to unravel the fringes automatically. The accuracy of the topography that results from this second pass will be better than 3 meters.

With a maximum radius (i.e. a baseline close to the ultimate limit of 5 km), it is possible, when the terrain is suitable therefore, to achieve results that are even finer, particularly when the baseline already makes it possible to improve distance resolution.

4) Differential Interferometry

The apparatus of the invention serves above all to make applications possible that are not defferred or that are defferred little (improvement in distance and in azimuth resolution, instantaneous interferometry, or interferometry along the track). Another advantage of the invention lies in differential interferometry insofar as it makes it possible to relax orbital constraints. In addition to conserving individual targets on the ground, differential interferometry requires spectral characteristics to be conserved in azimuth and in distance. In other words, the two passes of the satellite must intersect at a non-zero angle with the interferometric surfaces. By greatly increasing the size of this surface, the constellation makes it easier to satisfy these conditions, or to pick up the entire archive of an old radar satellite whose orbital control is rather poor.

The invention is not limited to the above examples.

What is claimed and desired to be secured by Letters Patent of the United States is:

1. Radar interferometry apparatus comprising at least one emitter satellite (E) and at least one constellation of receiver satellites (S), the apparatus being characterized in that the satellites are placed on orbits selected in such a manner that the receiver satellites aim at the zone of the ground that is illuminated by the emitter satellite, and such that:

the major axes thereof have the same length so that the satellites are accurately synchronous;

the focuses are separated by a distance which is the same for each of the orbits of the receiver satellites and which is greater than the distance between the focuses of the orbit of the emitter satellite, such that the eccentricity of a receiver satellite orbit is different from that of the emitter satellite orbit; and the arguments of their perigees have values that are uniformly distributed over 360° such that during one orbital period the receiver satellites travel round an ellipse (G) over which they are uniformly distributed, said ellipse being centered on the position that the emitter satellite would have had if its orbit had the same ascending node longitude and the same phasing as the orbits of the receiver satellites.

2. Apparatus according to claim 1, in which the emitter satellite is synchronous with the receiver satellites.

3. Apparatus according to claim 1, in which the orbits are heliosynchronous.

4. Apparatus according to claim 1 and comprising one or more groups of three receiver satellites ($S_1$, $S_2$, $S_3$; $S_4$, $S_5$, $S_6$) placed on one or more concentric ellipses.

5. Apparatus according to claim 1 and comprising an emitter satellite (E) placed on said ellipse which forms a portion of said constellation.

6. Apparatus according to claim 1 which comprises an emitter satellite (E) selected from the group of radar observation satellites such as ERS-1 and ERS-2, Radarsat, and J.ESR-1.

7. Apparatus according to claim 1 in which the receiver satellites (5) are designed to record continuously the signal from the zone on the ground illuminated by the emitter satellite, means being provided for resynchronizing the signal recorded in this way in the form of successive rows organized by increasing distance.

8. Apparatus according to claim 1 and comprising an emitter satellite (E) which includes an antenna-forming element (1) which extends substantially in a plane that contains the center of the earth and which carries solar cells (13) of a solar generator powering the emitter on a face thereof that is kept oriented towards the sun.

9. Apparatus according to claim 1, and comprising six receiver satellites ($S_{1-S6}$).

* * * * *